United States Patent
Dhawan et al.

(10) Patent No.: US 10,768,775 B2
(45) Date of Patent: Sep. 8, 2020

(54) TEXT DIRECTION INDICATOR

(71) Applicant: Microsoft Technology Licensing, LLC, Redmond, WA (US)

(72) Inventors: Harish Dhawan, Telangana (IN); Rahul Dhaundiyal, Hyderabad (IN); Jitendra Kumar, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 200 days.

(21) Appl. No.: 15/481,144

(22) Filed: Apr. 6, 2017

(65) Prior Publication Data

US 2018/0292969 A1 Oct. 11, 2018

(51) Int. Cl.
| | |
|---|---|
| G06F 3/0489 | (2013.01) |
| G06F 3/0481 | (2013.01) |
| G06F 3/02 | (2006.01) |
| G06F 3/01 | (2006.01) |
| G06F 40/166 | (2020.01) |

(52) U.S. Cl.
CPC .......... *G06F 3/04812* (2013.01); *G06F 3/018* (2013.01); *G06F 3/0219* (2013.01); *G06F 3/04892* (2013.01); *G06F 40/166* (2020.01)

(58) Field of Classification Search
CPC . G06F 3/04812; G06F 3/04892; G06F 3/0489
USPC ........ 715/703, 256, 262, 264, 273, 809, 857
See application file for complete search history.

(56) References Cited

U.S. PATENT DOCUMENTS

| | | | |
|---|---|---|---|
| 7,073,138 B2 | 7/2006 | Mirkin | |
| 9,335,837 B2 | 5/2016 | Li | |
| 2002/0059350 A1* | 5/2002 | Iwema | G06F 3/04883 715/234 |
| 2006/0265649 A1* | 11/2006 | Danilo | G06F 17/211 715/256 |
| 2006/0267966 A1 | 11/2006 | Grossman et al. | |
| 2009/0153475 A1 | 6/2009 | Kerr et al. | |
| 2009/0284532 A1 | 11/2009 | Kerr et al. | |
| 2011/0083108 A1 | 4/2011 | Klein et al. | |

FOREIGN PATENT DOCUMENTS

| | | | | |
|---|---|---|---|---|
| WO | 0138957 A2 | 5/2001 | | |
| WO | WO-0138957 A2 * | 5/2001 | ........... | G06F 3/0233 |

OTHER PUBLICATIONS

"How can I specify text direction and cursor behavior for bi-directional languages?", https://www.ibm.com/support/knowledgecenter/en/SSKTWP_8.5.3/com.ibm.notes85.client.doc/pref_text_cursor_bidirectional_t.html, Retrieved on: Dec. 29, 2016, 1 pages.

"Working with Bidirectional Text", http://web.archive.org/web/20120110143229/http:/docs.oracle.com/javase/tutorial/2d/text/textlayoutbidirectionaltext.html, Published on: Jan. 10, 2012, 8 pages.

* cited by examiner

*Primary Examiner* — Rinna Yi
(74) *Attorney, Agent, or Firm* — Shook, Hardy & Bacon, L.L.P.

(57) ABSTRACT

Systems, methods, and computer-executable instructions for indicating a text direction are disclosed. Operations for indicating a text direction may include determining an insertion point in a bidirectional document. A keyboard layout at the insertion point is determined. A visual characteristic for a cursor, that indicates a text direction of the first keyboard layout, is selected based upon the keyboard layout. A cursor with the visual characteristics is displayed.

20 Claims, 8 Drawing Sheets

TEXT DIRECTION INDICATOR

BACKGROUND

Documents can contain text in multiple languages, where the text in different languages flow in different directions. For example, a document can contain both English and Hebrew. English is considered a left-to-right (LTR) language in that its characters flow from left to right when rendered/read. Other LTR languages include Hindi, French, and Japanese. Hebrew is considered a right-to-left language (RTL) since its characters flow from right to left when rendered/read. Urdu is another example of a RTL language.

In a bi-directional document, a document that contains both LTR and RTL characters, the direction of text at an insertion point ideally is communicated to a user. When editing a bi-directional document, a user may frequently switch between LTR and RTL sections of the document. Past examples of indicating the text flow at an insertion point have included providing an indication of the current language in a taskbar and having a caret at the top of the text cursor. The carets can be undesired and distracting to some users. Providing an indication of the current language in a taskbar requires the user to know the text direction of the language and causes the user to move focus from the document to the taskbar. In addition, in some modes, such as full screen, the taskbar can be hidden.

SUMMARY

This Summary is provided to introduce a selection of concepts in a simplified form that are further described in the Detailed. Description. This Summary is not intended to identify key features or essential features of the claimed subject matter, nor is it intended to be used to limit the scope of the claimed invention.

In accordance with one or more aspects, systems, methods, and computer-readable storage media that store computer-executable instructions for indicating a text direction are disclosed herein. The system may include a processing unit. The methods may be implemented using a processing unit and the computer-executable instructions may be executed by a processing unit. Operations for indicating a text direction may include determining a first insertion point in a bidirectional document comprising at least two languages. The at least two languages include a left-to-right language and a right-to-left language. A first keyboard layout at the first insertion point is determined. The first keyboard layout includes left-to-right mode or right-to-left mode. A visual characteristic of a cursor, that indicates a text direction of the first keyboard layout, is selected based upon the first keyboard layout. The first cursor with the visual characteristic is displayed at the insertion point.

DETAILED DESCRIPTION

In accordance with techniques described herein, a cursor provides an indication of the direction of text at a particular point within a document. In an example, the cursor is a text cursor at an insertion point in the document. The text cursor provides a visual indication showing that inserted text will flow from left to right or right to left. In an example, the visual indication is vertical bars to the left or right of the cursor. The vertical bars include different visual characteristics, such as different colors, different shades, opacity, etc., which provides an indication of the direction of the text.

Providing an indication of the direction of text is useful given the rise of multi-language documents. For example, meal menus for an airplane may include the available items in two or more languages. Accordingly, editing these menus can require switching between the languages used in the menu. The text direction of the different languages may be different. Thus, there is a need for an editor of multi-language documents to easily indicate the text flow at a particular point within a document.

The techniques described herein can be implemented in the general context of computer-executable instructions, such as those included in software-implemented programs, being executed in a computing system on a target real or virtual processor. As an example, such programs may include routines, libraries, objects, classes, components, data structures, etc. that perform particular tasks or implement particular data types. The functionality of the programs may be combined or split between program units as desired in various embodiments. Computer-executable instructions for programs may be executed within a local or distributed computing system. Additionally, the techniques described herein can be implemented in the context of a system, a device, an apparatus, or a like machine. In general, a computing system or computing device can be local or distributed, and can include any combination of special-purpose hardware and/or general-purpose hardware with software implementing the functionality described herein.

Figure 1:
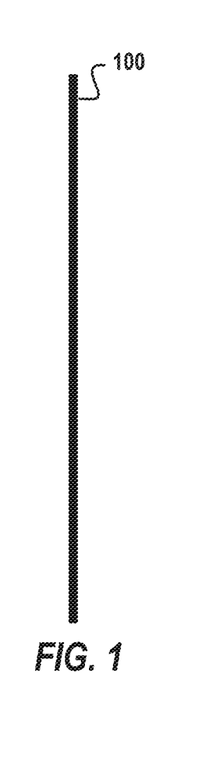
FIG. 1 illustrates a cursor that does not provide an indication of text direction.

FIG. 1 is a cursor 100 that does not provide any indication of text direction. The cursor 100 indicates an insertion point in a document. Text typed will be inserted in the document beginning at the location of the cursor 100. The cursor 100 may blink or flash to be more visible to a user. The cursor 100, however, does not provide an indication if the text will be inserted at the left or right of the cursor.

Figure 2:
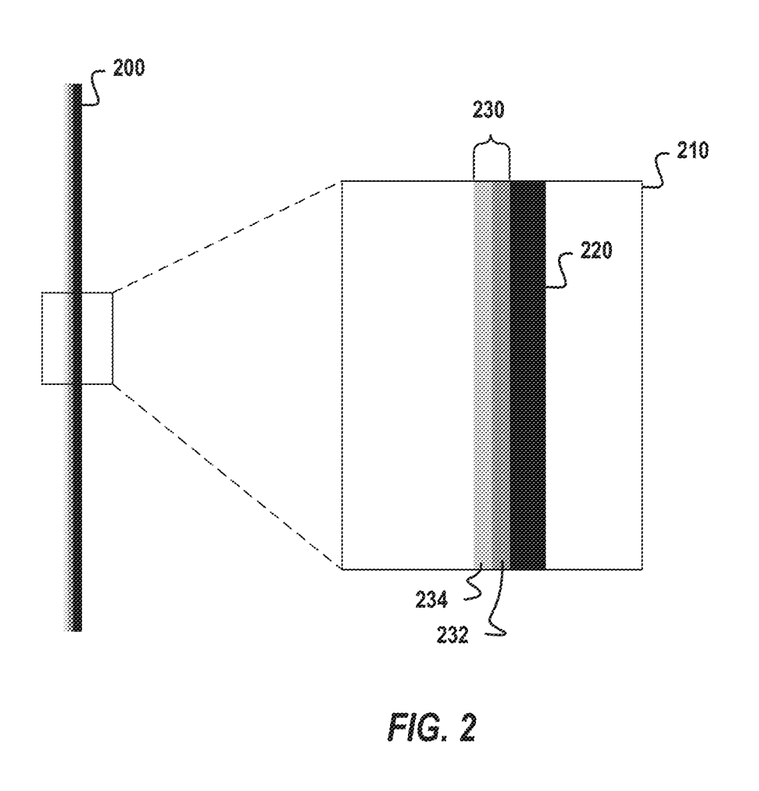
FIG. 2 illustrates parts of a cursor that indicates an LTR text flow in accordance with respective examples.

FIG. 2 illustrates parts of a cursor 200 that indicates an LTR text flow in accordance with respective examples. The cursor 200 provides an indication of the text direction. A magnified portion 210 of the cursor 200 shows a main portion 220 of the cursor 200. The main portion 220 is similar to the cursor 100. The cursor 200, however, also includes a directional portion 230. In the illustrated cursor 200, the directional portion 230 includes a first vertical bar 232 and a second vertical bar 234. The directional portion 230 is located to the right of the main portion 220. The vertical bars 232 and 234 of the directional portion 230 have the same height as the main portion 220 of the cursor 200. The placement of the directional portion 230 provides the indication that the cursor will move to the right as text is typed. Thus, the text direction is LTR.

In the illustrated example, the directional portion 230 includes two vertical bars 232 and 234. In an example, the directional portion 230 includes just one vertical bar. In another example, the directional portion 230 includes three or more vertical bars. The width of the cursor being one limiting factor as to how many vertical bars there can be. A text cursor should be wide enough to be easily seen but equal to or less than a character width. In an example, the width of the direction portion 230 is equal to the width of the main portion 220.

The cursor 200 is illustrated as having three colors. The different colors help provide the indication of the text direction. The main portion 220 is a color that is darkest among the three colors. The first vertical bar 232 is a color that is lighter than the main portion, but darker than the second vertical bar 234. The second vertical bar 234 is the lightest of the three colors. In an example, the main portion 220 is black, with the first vertical bar 232 being gray with an intensity of 50%, and with the second vertical bar 234 being gray with an intensity of 25%. Alternatively, the three colors can be different shades of one color. In other examples, the colors may be different. For example, the colors of the various portions of the cursor may be different hues. In an example, the colors may change to provide a visual animation of movement in the direction of the text direction. For example, the intensity of the first and second vertical bars may be at 75% and 50% intensity of the main portion's color at a first time. Then at a second time, the first and second vertical bars may be at 50% and 25% intensity of the main portion's color. The different intensities may be cycled through to provide a visual animation of the text direction.

Figure 3A:
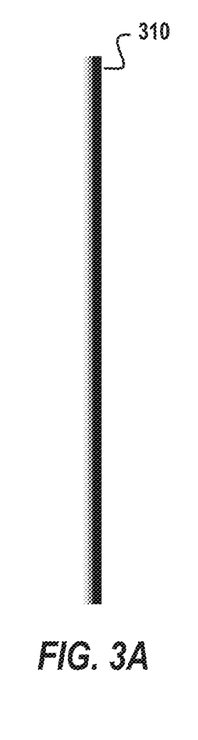
FIG. 3A illustrates a cursor that indicates an LTR text flow in accordance with respective examples.
Figure 3B:
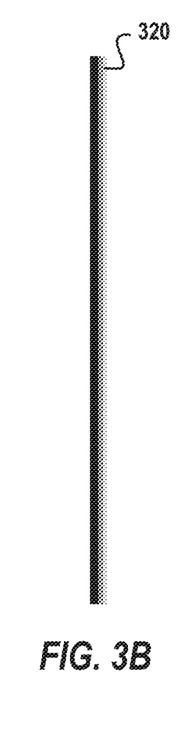
FIG. 3B illustrates a cursor that indicates an RTL text flow in accordance with respective examples.

FIG. 3A illustrates a cursor 310 that indicates an LTR text flow in accordance with respective examples. The cursor 310 is the same as the cursor 200 illustrated in FIG. 2. The text at the insertion point though could be an RTL language. FIG. 3B illustrates a cursor 320 that indicates an RTL text flow in accordance with respective examples. The cursor 320 has its directional portion located to right of the main portion of the cursor. The directional portion indicates that text entered at the current insertion point will move the cursor to the left as text is typed. Thus, indicating that the text flow is RTL rather than LTR.

Figure 4:
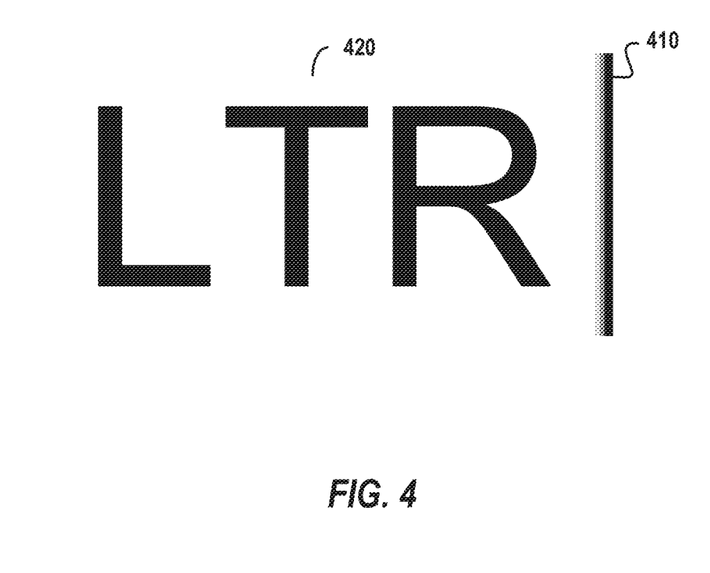
FIG. 4 illustrates text and a cursor that indicates an LTR text flow in accordance with respective examples.
Figure 5:
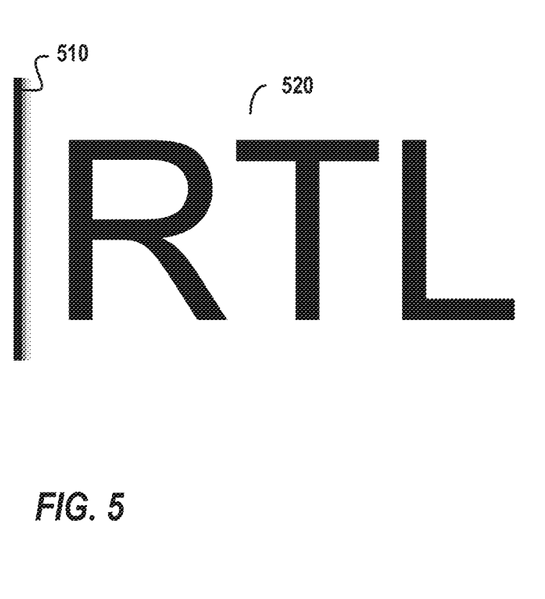
FIG. 5 illustrates text and a cursor that indicates an RTL text flow in accordance with respective examples.

The differences between LTR and RTL are further illustrated in FIGS. 4 and 5. FIG. 4 illustrates text 420 and a cursor 410 that indicates an LTR text flow in accordance with respective examples. FIG. 5 illustrates text 520 and a cursor 510 that indicates an RTL text flow in accordance with respective examples.

Figure 6:
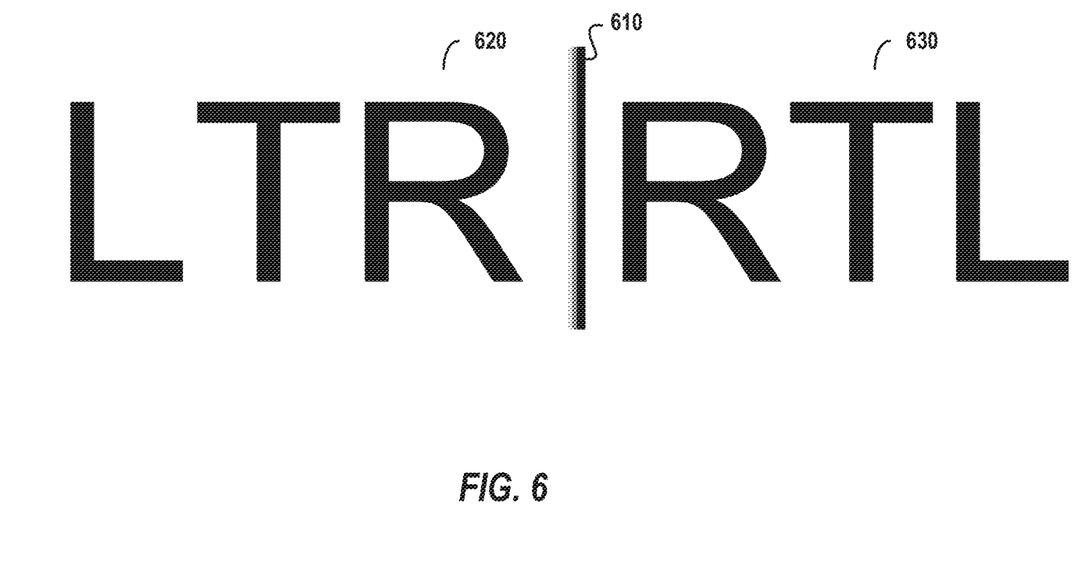
FIG. 6 illustrates text, an ambiguous insertion point and a cursor that indicates an LTR text flow in accordance with respective examples.
Figure 7:
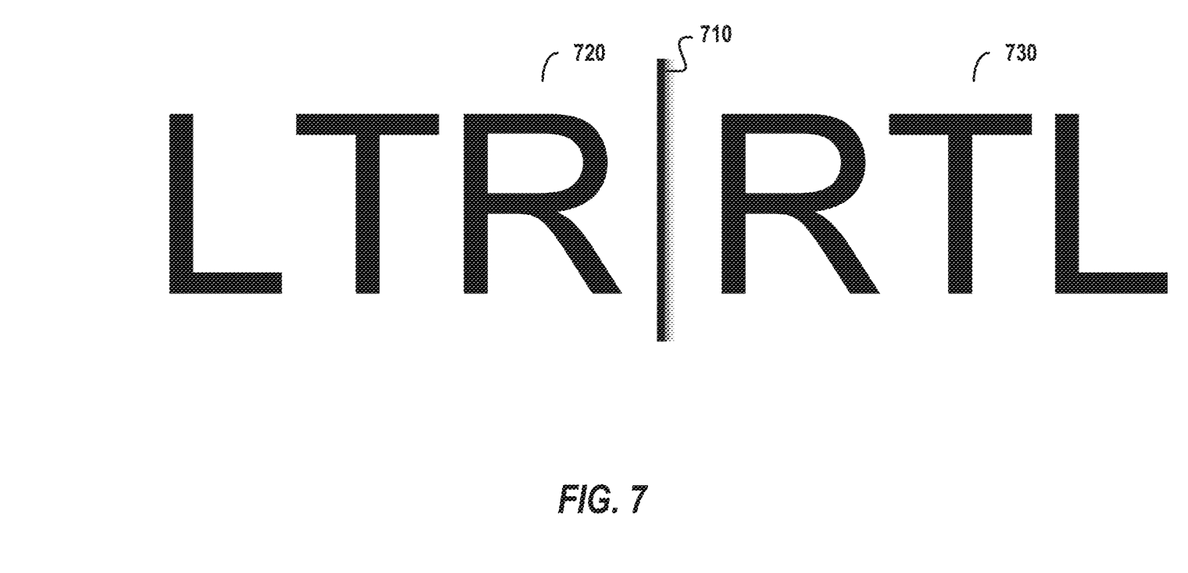
FIG. 7 illustrates text, an ambiguous insertion point and a cursor that indicates an RTL text flow in accordance with respective examples.

Within a bi-directional document, the text direction at times may be deduced based upon the text. For example, the text direction at an insertion point between two LTR words would likely still be LTR. The text direction though could be ambiguous. LTR and RTL text may be located on the same line. For example, an LTR word may be next to an RTL word on the same line. The text direction at the insertion point between these words would be ambiguous. That is, the text direction could be LTR or RTL. With the cursor 100 illustrated in FIG. 1, the user would have no indication from the cursor 100 the text direction. FIGS. 6 and 7 illustrate an ambiguous insertion point with a cursor that provides an indication of the text direction. FIG. 6 illustrates text 620 and 630, an ambiguous insertion point and a cursor 610 that indicates an LTR text flow in accordance with respective examples. FIG. 7 illustrates text 720 and 730, an ambiguous insertion point and a cursor 710 that indicates an RTL text flow in accordance with respective examples. In both FIGS. 6 and 7, the cursor is shown at an ambiguous insertion point between LTR and RTL text. The cursors 610 and 710, however, provide a visual indication of the text direction.

Figure 8:
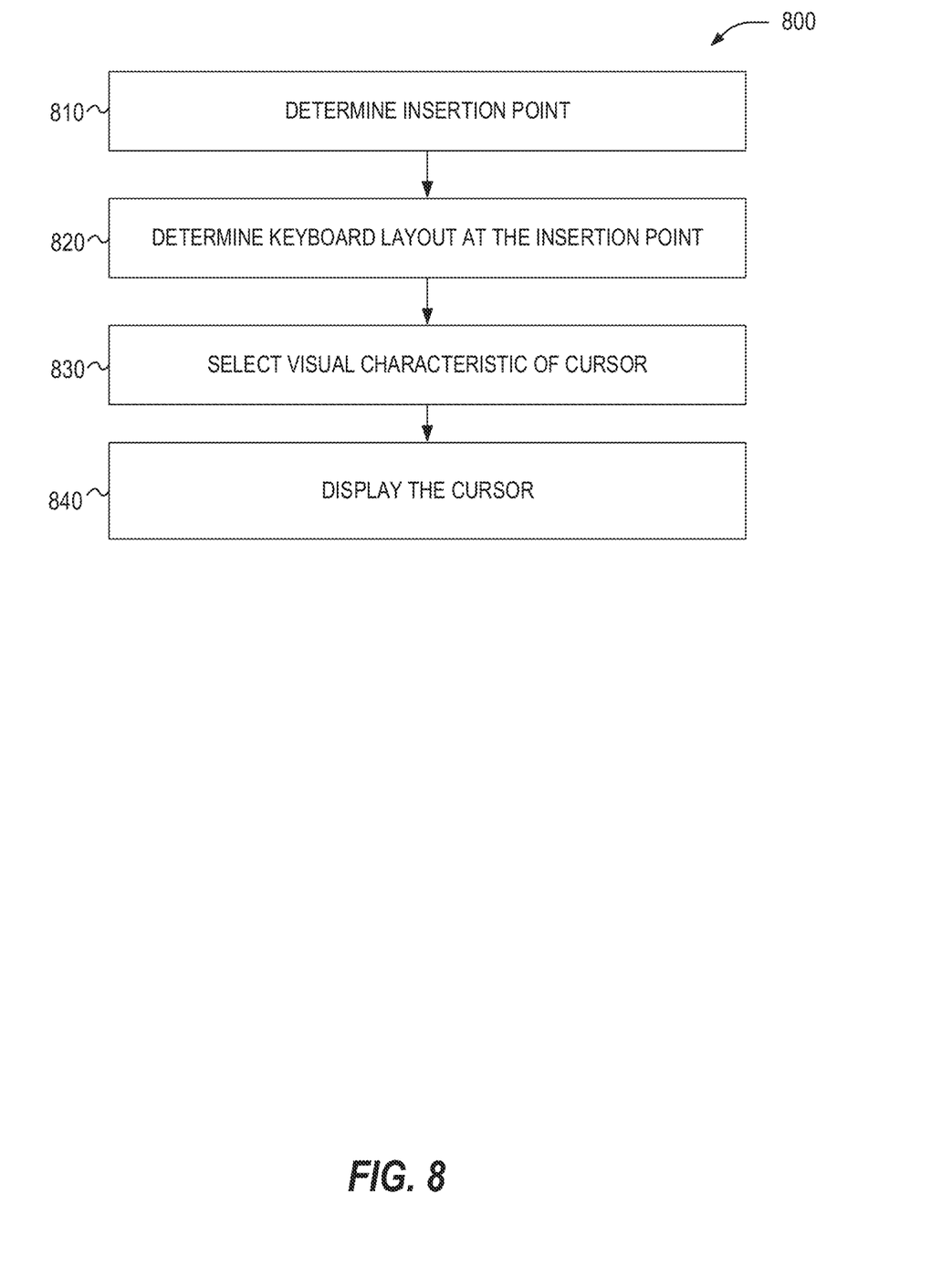
FIG. 8 illustrates a flow diagram of example processes for indicating direction of text in accordance with respective examples.

FIG. 8 illustrates a flow diagram of example processes for indicating direction of text in accordance with respective examples. The process 800 may start at 810 when an insertion point within a document is determined. In an example, the insertion point is where text will be entered when typed. The document may include two or more languages having different text directions. For example, the document can include at least one LTR language and at least one RTL language. Such a document may be called a bi-directional document. At 820, the keyboard layout at the insertion point is determined. The keyboard layout provides an indication of the current language that will be inserted into the bidirectional document. In an example, the keyboard layout is accessed via the bidirectional document. For example, the bidirectional document can be queried to determine to determine the keyboard layout at the insertion point. In an example, the keyboard layout may depend on the current language setting of an operating system.

At 830, visual characteristics of a cursor is determined based upon the keyboard layout. In an example, visual characteristics are selected based upon if the keyboard layout is for an LTR or RTL language. For example, the direction of text may be used to select either cursor 310 or cursor 320 as shown in FIGS. 3A and 3B. At 840, the cursor with the selected visual characteristics is displayed at the insertion point.

A bi-directional document may have multiple editors editing the document at the same time. Each editor may have their own insertion point. Thus, at an insertion point of a first user a LTR cursor may be displayed while at an insertion point of a second user a RTL cursor may be displayed. The cursors for both editors may be displayed simultaneously to one or both of the editors.

In another example, the cursor may be another movable cursor, such as a mouse cursor, rather than a text cursor. In this example, the insertion point is the location of the mouse cursor rather than a text insertion point. The mouse cursor's visual characteristics may be changed in a similar way to the text cursor with the addition of a directional portion that provides an indication of the text direction at the insertion point.

Figure 9:
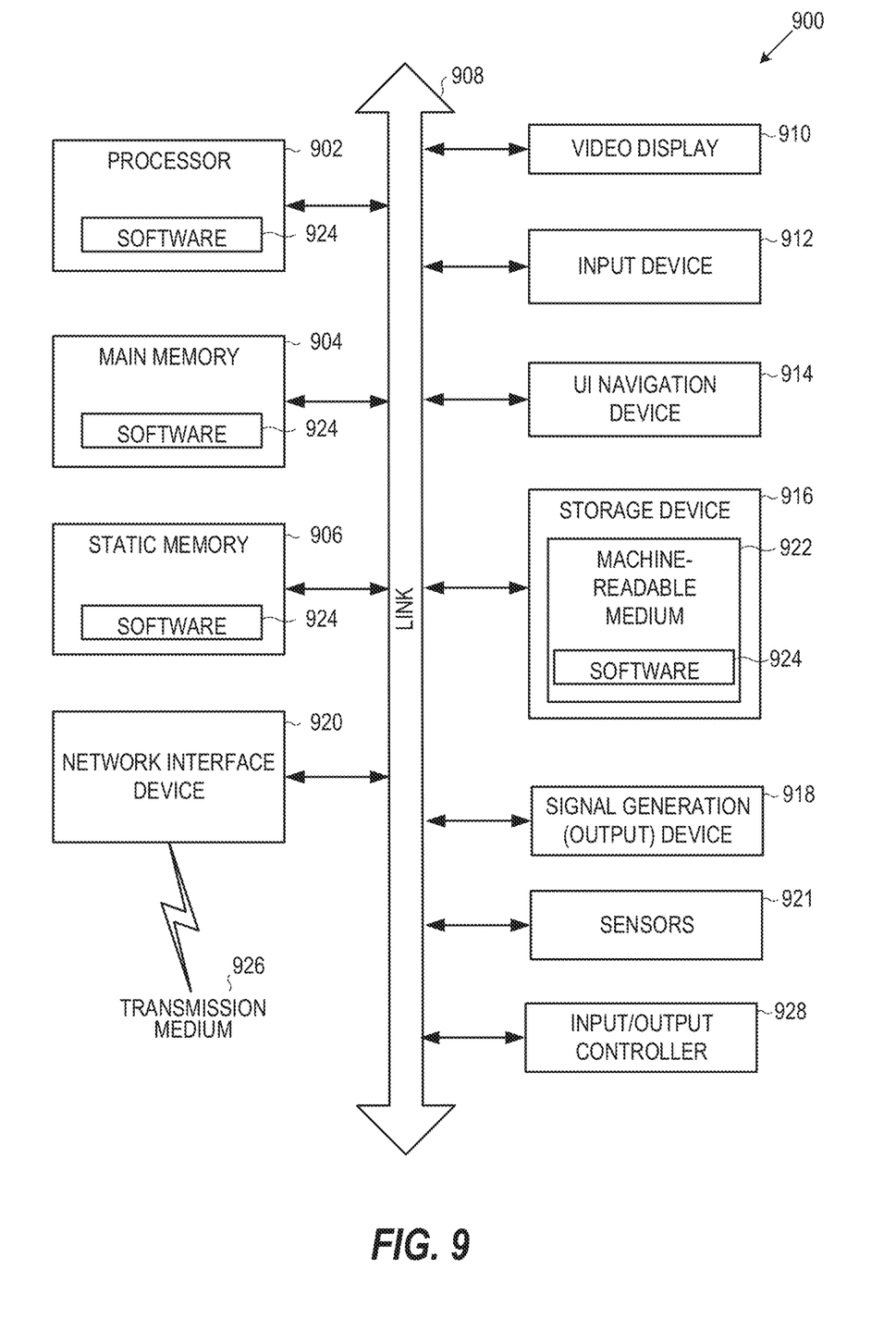
FIG. 9 is an example computing device that can be used in conjunction with the technologies described herein.

FIG. 9 is an example computing device that can be used in conjunction with the technologies described herein. In alternative embodiments, the computing device 900 may operate as a standalone device or may be connected (e.g., networked) to other computing devices. In a networked deployment, the computing device 900 may operate in the capacity of a server communication device, a client communication device, or both in server-client network environments. In an example, the computing device 900 may act as a peer computing device in peer-to-peer (P2P) (or other distributed) network environment. The computing device 900 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The computing device 900 may further include a display unit 910, an input device 912 (e.g., a keyboard), and a user interface (UI) navigation device 914 (e.g., a mouse). In an example, the display unit 910, input device 912, and UI navigation device 914 may be a touch screen display. In an example, the input device 912 may include a touchscreen, a microphone, a camera (e.g., a panoramic or high-resolution camera), physical keyboard, trackball, or other input devices.

The computing device 900 may additionally include a storage device (e.g., drive unit) 916, a signal generation device 918 (e.g., a speaker, a projection device, or any other type of information output device), a network interface device 920, and one or more sensors 921, such as a global positioning system (GPS) sensor, compass, accelerometer, motion detector, or other sensor. The computing device 900 may include an input/output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 916 may include a computer-readable (or machine-readable) storage media 922, on which is stored one or more sets of data structures or instructions 924 (e.g., software) embodying or utilized by any one or more of the techniques or functions described herein. In an example, at least a portion of the software may include an operating system and/or one or more applications (or apps) implementing one or more of the functionalities described herein. The instructions 924 may also reside, completely or at least partially, within the main memory 904, within the static memory 906, and/or within the hardware processor 902 during execution thereof by the computing device 900. In an example, one or any combination of the hardware processor 902, the main memory 904, the static memory 906, or the storage device 916 may constitute computing device machine) readable media.

While the computer-readable storage media 922 is illustrated as a single medium, a "computer-readable storage media" or "machine-readable storage media" may include a single medium or multiple media (e.g., a centralized or distributed database, and/or associated caches and servers) configured to store the one or more instructions 924.

In an example, a computer-readable storage media or machine-readable storage media may include any media that is capable of storing, encoding, or carrying instructions for execution by the computing device 900 and that cause the computing device 900 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 920 may use the transfer protocols to transmit data using transitory propagating signals.

In an example, the network interface device 920 may include one or more physical jacks (e.g., Ethernet, coaxial, or phone jacks) or one or more antennas to connect to the communications network 926. In an example, the network interface device 920 may include one or more wireless modems, such as a Bluetooth modem, a Wi-Fi modem or one or more modems or transceivers operating under any of the communication standards mentioned herein. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. In an example, a transmission medium may include any intangible medium that is capable of storing, encoding or carrying instructions for execution by the computing device 900, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for indicating a text direction, the system comprising: a processor; and
    memory coupled to the processor, the memory including instructions, which when executed by the processor, cause the processor to perform operations comprising:
    determining a first insertion point in a bidirectional document comprising at least two languages, wherein the at least two languages comprise a left-to-right (LTR) language and a right-to-left (RTL) language;
    determining a first keyboard layout at the first insertion point, wherein the first keyboard layout comprises a left-to-right mode or a right-to-left mode;
    identifying a visual characteristic of a directional portion of a first cursor comprising both a main portion and the directional portion, the visual characteristic distinguishing the directional portion from the main portion, and wherein the directional portion of the first cursor indicates a text direction of text to be entered at the first insertion point, based upon the first keyboard layout; and
    displaying the first cursor comprising the main portion and the directional portion at the first insertion point, wherein the directional portion is located left of the main portion of the first cursor when the first keyboard layout is in the LTR mode, and wherein the directional portion is located right of the main portion of the first cursor when the first keyboard layout is in the RTL mode.

2. The system of claim 1, wherein the first cursor is a text cursor, wherein the visual characteristic comprises at least two vertical bars with a same height as the text cursor and located at a first side of the main portion and abutting the main portion.

3. The system of claim 2, wherein the first keyboard layout is the RTL mode, and wherein the at least two vertical bars are located to the right of the main portion of the text cursor.

4. The system of claim 2, wherein the first keyboard layout is the LTR mode, and wherein the at least two vertical bars are located to the left of the main portion of the text cursor.

5. The system of claim 2, wherein the at least two vertical bars comprise a first vertical bar of a first color that abuts the main portion of the text cursor and a second vertical bar of a second color that abuts the first vertical bar, wherein the second color is a lighter shade of the first color, and wherein a width of the main portion of the text cursor is equal to a width of the at least two vertical bars.

6. The system of claim 5, wherein the first color is a lighter shade of a color of the main portion of the text cursor.

7. The system of claim 1, wherein the operations further comprise:
    determining a second insertion point in the bidirectional document;
    determining a second keyboard layout at the second insertion point, wherein the second keyboard layout is different from the first keyboard layout;
    setting a visual characteristic of a second cursor, that indicates a text direction at the second insertion point, based upon the second keyboard layout; and
    displaying the second cursor at the second insertion point simultaneously with the first cursor.

8. The system of claim 1, wherein the first cursor is a mouse cursor.

9. A method for indicating a text direction, the method comprising:
    determining a first insertion point in a bidirectional document comprising at least two languages, wherein the at least two languages comprise a left-to-right (LTR) language and a right-to-left (RTL) language;
    determining a first keyboard layout at the first insertion point, wherein the first keyboard layout comprises a left-to-right mode or a right-to-left mode;
    identifying a visual characteristic of a directional portion of a first cursor comprising both a main portion and the directional portion, the visual characteristic distinguishing the directional portion from the main portion, and wherein the directional portion of the first cursor indicates a text direction of text to be entered at the first insertion point, based upon the first keyboard layout; and
    displaying the first cursor comprising the main portion and the directional portion at the first insertion point, wherein the directional portion is located left of the main portion of the first cursor when the first keyboard layout is in the LTR mode, and wherein the directional portion is located right of the main portion of the first cursor when the first keyboard layout is in the RTL mode.

10. The method of claim 9, wherein the first cursor is a text cursor, wherein the visual characteristic comprises at least two vertical bars with a same height as the text cursor and located at a first side of the main portion and abutting the main portion, and wherein a width of the main portion of the text cursor is equal to a width of the at least two vertical bars.

11. The method of claim 10, wherein the first keyboard layout is the RTL mode, and wherein the at least two vertical bars are located to the right of the main portion of the text cursor.

12. The method of claim 10, wherein the first keyboard layout is the LTR mode, and wherein the at least two vertical bars are located to the left of the main portion of the text cursor.

13. The method of claim 10, wherein the at least two vertical bars comprise a first vertical bar of a first color that abuts the main portion of the text cursor and a second vertical bar of a second color that abuts the first vertical bar, wherein the second color is a lighter shade of the first color.

14. The method of claim 13, wherein the first color is a lighter shade of a color of the main portion of the text cursor.

15. The method of claim 9, further comprising:
    determining a second insertion point of the bidirectional document;
    determining a second keyboard layout at the second insertion point, wherein the second keyboard layout is different from the first keyboard layout;
    setting a visual characteristic of a second cursor based upon the second keyboard layout; and
    displaying the second cursor simultaneously with the first cursor.

16. The method of claim 9, wherein the first cursor is a mouse cursor.

17. A computer-readable storage media storing computer-executable instructions for causing a computing device to notify user interface (UI) components of state changes, the stored instructions comprising:
- instructions to determine a first insertion point in a bidirectional document comprising at least two languages, wherein the at least two languages comprise a left-to-right (LTR) language and a right-to-left (RTL) language;
- instructions to determine a first keyboard layout at the first insertion point, wherein the first keyboard layout comprises a left-to-right mode or a right-to-left mode;
- instructions to identify a visual characteristic of a directional portion of a first cursor comprising both a main portion and the directional portion, the visual characteristic distinguishing the directional portion from the main portion and, wherein the directional portion of the first cursor indicates a text direction of text to be entered at the first insertion point, based upon the first keyboard layout; and
- instructions to display the first cursor comprising the main portion and the directional portion at the first insertion point, wherein the directional portion is located left of the main portion of the first cursor when the first keyboard layout is in the LTR mode, and wherein the directional portion is located right of the main portion of the first cursor when the first keyboard layout is in the RTL mode.

18. The computer-readable storage media of claim 17, wherein the first cursor is a text cursor, wherein the visual characteristic comprises at least two vertical bars with a same height as the text cursor and located at a first side of the main portion and abutting the main portion, and wherein a width of the main portion of the text cursor is equal to a width of the at least two vertical bars.

19. The computer-readable storage media of claim 18, wherein the first keyboard layout is RTL, and wherein the at least two vertical bars are located to the right of the main portion of the text cursor.

20. The computer-readable storage media of claim 18, wherein the first keyboard layout is LTR, and wherein the at least two vertical bars are located to the left of the main portion of the text cursor.

* * * * *